(12) United States Patent
Schroter et al.

(10) Patent No.: US 6,401,192 B1
(45) Date of Patent: Jun. 4, 2002

(54) APPARATUS FOR SOFTWARE INITIATED PREFETCH AND METHOD THEREFOR

(75) Inventors: David Andrew Schroter, Round Rock; Michael Thomas Vaden, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/166,435

(22) Filed: Oct. 5, 1998

(51) Int. Cl.$^7$ ................................................. G06F 9/00
(52) U.S. Cl. ...................................... 712/207; 711/137
(58) Field of Search ................................ 712/207, 227, 712/230, 241, 239; 711/137, 213

(56) References Cited

U.S. PATENT DOCUMENTS

| | | | |
|---|---|---|---|
| 4,298,927 A | | 11/1981 | Berglund et al. ............ 364/200 |
| 5,357,618 A | | 10/1994 | Mirza et al. ................. 395/400 |
| 5,396,604 A | | 3/1995 | DeLano et al. .............. 395/375 |
| 5,649,144 A | * | 7/1997 | Gostin et al. ................ 711/220 |
| 5,732,242 A | * | 3/1998 | Mowry ........................ 711/136 |
| 5,752,037 A | * | 5/1998 | Gornish et al. .............. 395/709 |
| 5,822,790 A | * | 10/1998 | Mehrotra ..................... 711/213 |
| 5,903,911 A | * | 5/1999 | Gaskins ....................... 711/141 |
| 5,909,566 A | * | 6/1999 | Cai et al. ..................... 712/207 |
| 5,940,876 A | * | 8/1999 | Pickett ........................ 711/220 |
| 6,012,106 A | * | 1/2000 | Schumann et al. ........... 710/22 |
| 6,202,130 B1 | * | 3/2001 | Scales, III et al. ........... 711/137 |

* cited by examiner

*Primary Examiner*—Larry D. Donaghue
(74) *Attorney, Agent, or Firm*—Barry S. Newberger; Winstead Sechrest & Minick P.C.; Marilyn S. Dawkins

(57) ABSTRACT

A mechanism and method for software hint initiated prefetch is provided. The prefetch may be directed to a prefetch of data for loading into a data cache, instructions for entry into an instruction cache or for either, in an embodiment having a combined cache. In response to a software instruction in an instruction stream, a plurality of prefetch specification data values are loaded into a register having a plurality of entries corresponding thereto. Prefetch specification data values include the address of the first cache line to be prefetched, and the stride, or the incremental offset, of the address of subsequent lines to be prefetched. Prefetch requests are generated by a prefetch control state machine using the prefetch specification data values stored in the register. Prefetch requests are issued to a hierarchy of cache memory devices. If a cache hit occurs having the specified cache coherency, the prefetch is vitiated. Otherwise, the request is passed to system memory for retrieval of the requested cache line.

8 Claims, 9 Drawing Sheets

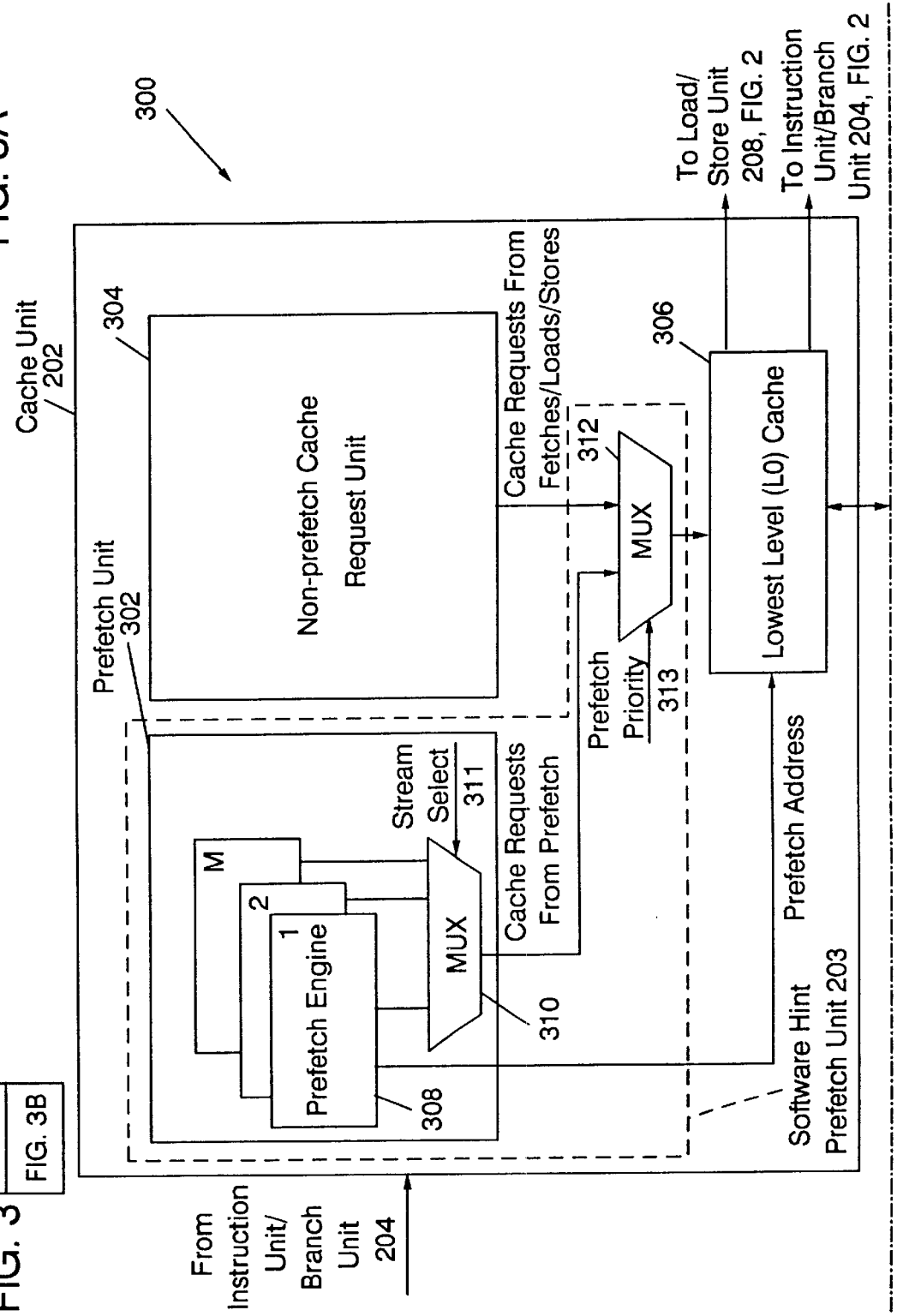

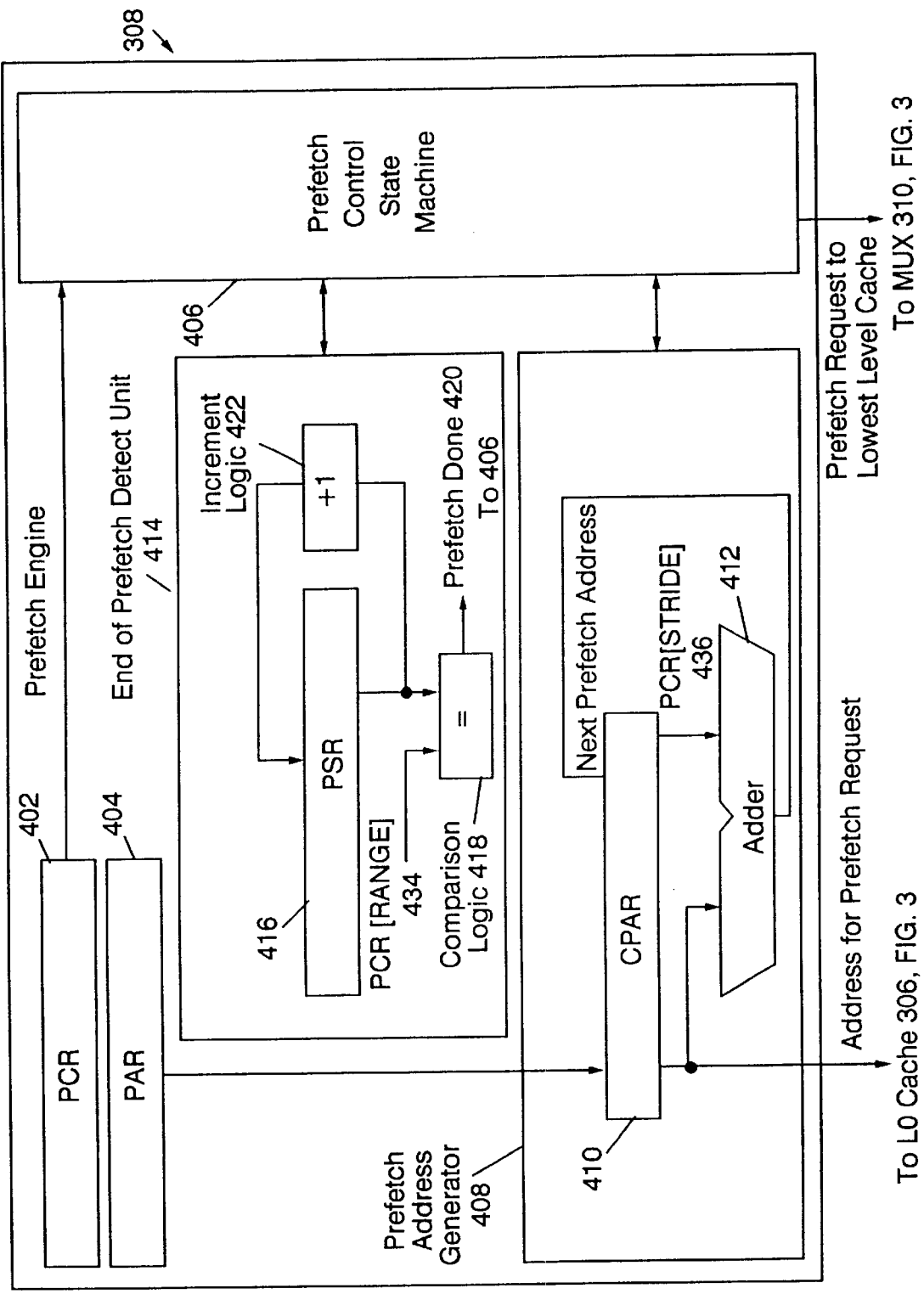

FIG. 4B

| Address 432 | Range 434 | Stride 436 | Cache Level 438 | Coherency 440 | Overlap 442 | Enable 444 | Direction 446 |
|---|---|---|---|---|---|---|---|
| K bits | L bits | M bits | N bits | P bits | Q bits | R bits | S bits |

| Count 446 | Done 450 |
|---|---|
| L bits | T bits |

416

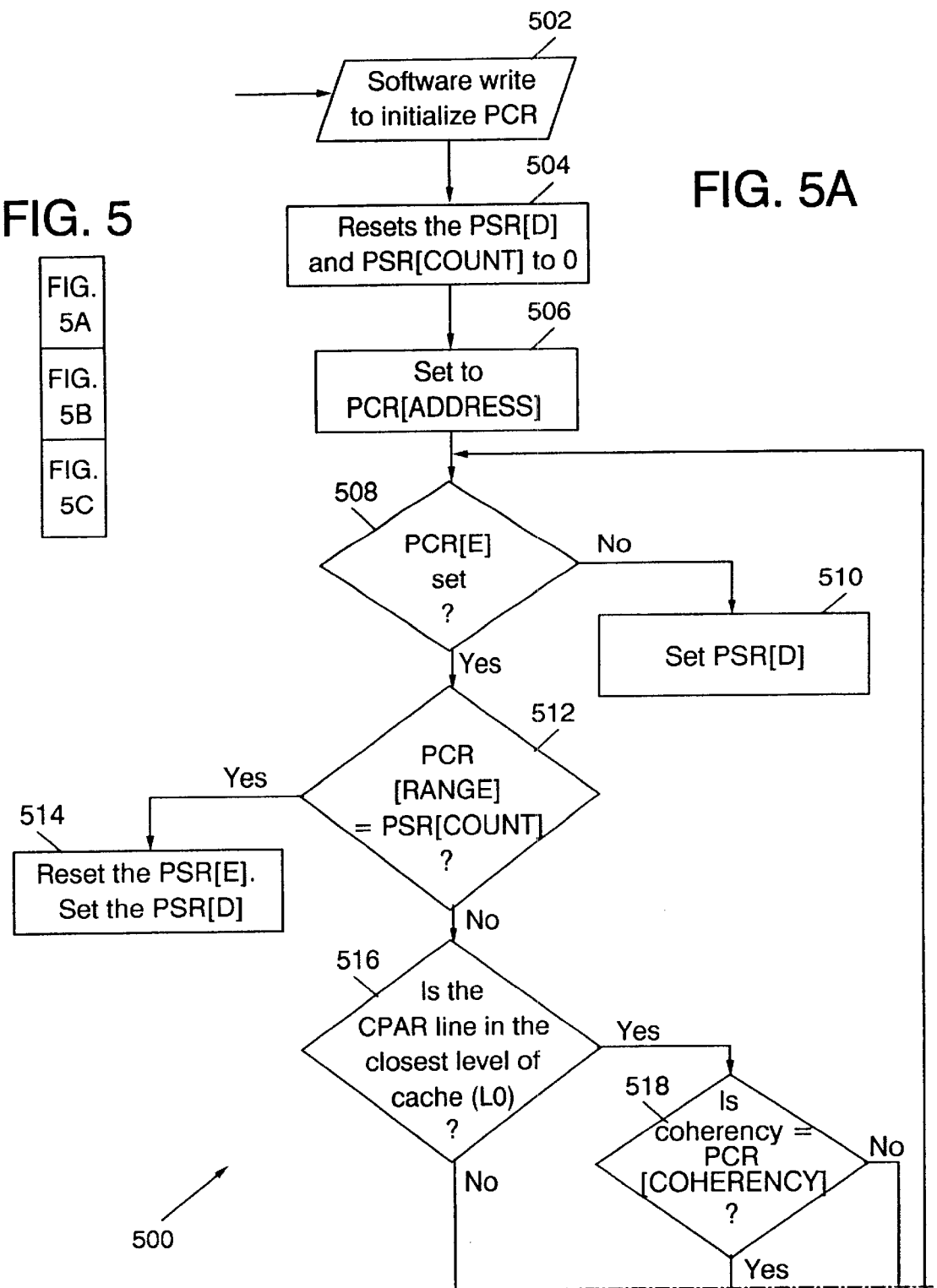

APPARATUS FOR SOFTWARE INITIATED PREFETCH AND METHOD THEREFOR

TECHNICAL FIELD

The present invention relates in general to a data processing system, and in particular, to instruction prefetch in a data processing system.

BACKGROUND INFORMATION

As computers have been developed to perform a greater number of instructions at greater speeds, many types of architectures have been developed to optimize this process. For example, the reduced instruction set computer (RISC) device uses simpler instructions and greater parallelism in executing those instructions to ensure that computational results will be available more quickly than the results provided by more traditional data processing systems. In addition to providing increasingly parallel execution of instructions, some data processing systems employ memory devices within the processor to permit retrieval of instructions from a system memory before they are required for execution by the processor. A set of instructions is loaded from a system memory device into this processor memory, the so-called primary or level 1 (L1) cache for subsequent dispatching to execution units within the processor. The set of instructions loaded from memory includes a sufficient number of instructions to fill a block of cache memory of predetermined size, a "cache line."

Fetching units first look to the cache for the next instruction it needs. If the instruction is not in the cache, a "cache miss," the fetching unit must retrieve the instruction from the system memory, slowing down instruction processing. In such a cache miss, the cache fetches the requested instruction or data, and prefetches from memory sufficient succeeding instructions or data to fill the remaining locations in the cache line.

Thus, a cache line prefetch is delayed until the cache miss occurs. Then, a fixed number of instructions, or a fixed number of data words, enough to fill a single cache line, are prefetched from system memory. The number of instructions, or the amount of data, is predetermined, even if it is probable that, because of the software being executed, a subsequent instruction or data request will hit beyond the cache line boundary. This may diminish the reduction in memory latency that might otherwise be obtained if software participated in the prefetch process. Thus, there is a need in the art for a mechanism by which software may initiate the prefetch of data and instructions.

SUMMARY OF THE INVENTION

The aforementioned needs are addressed by the present invention. Accordingly, there is provided, in a first form, a mechanism for software hint initiated prefetch. The mechanism includes circuitry operable for issuing at least one prefetch request to one or more memory devices in response to a software instruction, the circuitry including at least one first register having a plurality of fields each operable for receiving a corresponding data value, each data value specifying a parameter for controlling the prefetch.

There is also provided, in a second form, a method of software hint initiated prefetch. The method includes the steps of storing a plurality of prefetch specifications in a register in response to a software instruction, and initiating a prefetch request for a cache line having an address corresponding to a first one of the plurality of prefetch specifications.

Additionally there is provided, in a third form, a data processing system for software hint initiated prefetch including at least one first memory device and at least one second memory device, and a data processor coupled to the at least one first and second memory devices. The data processor contains circuitry operable for issuing at least one prefetch request to the at least one first and second memory devices in response to a software instruction, the circuitry including at least one first register having a plurality of fields each operable for receiving a corresponding data value, each data value specifying a parameter for controlling the prefetch.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 and FIGS. 3A–3B illustrate, in block diagram form, a mechanism for software hint initiated prefetches in accordance with one embodiment of the present invention;

FIGS. 4A–4C illustrate, in block diagram form, a prefetch engine according to one embodiment of the present invention; and FIG. 5, and FIGS. 5A–5C illustrate, in flow diagram form, a process for a prefetch control state machine in accordance with one embodiment of the present invention.

DETAILED DESCRIPTION

Figure 1:
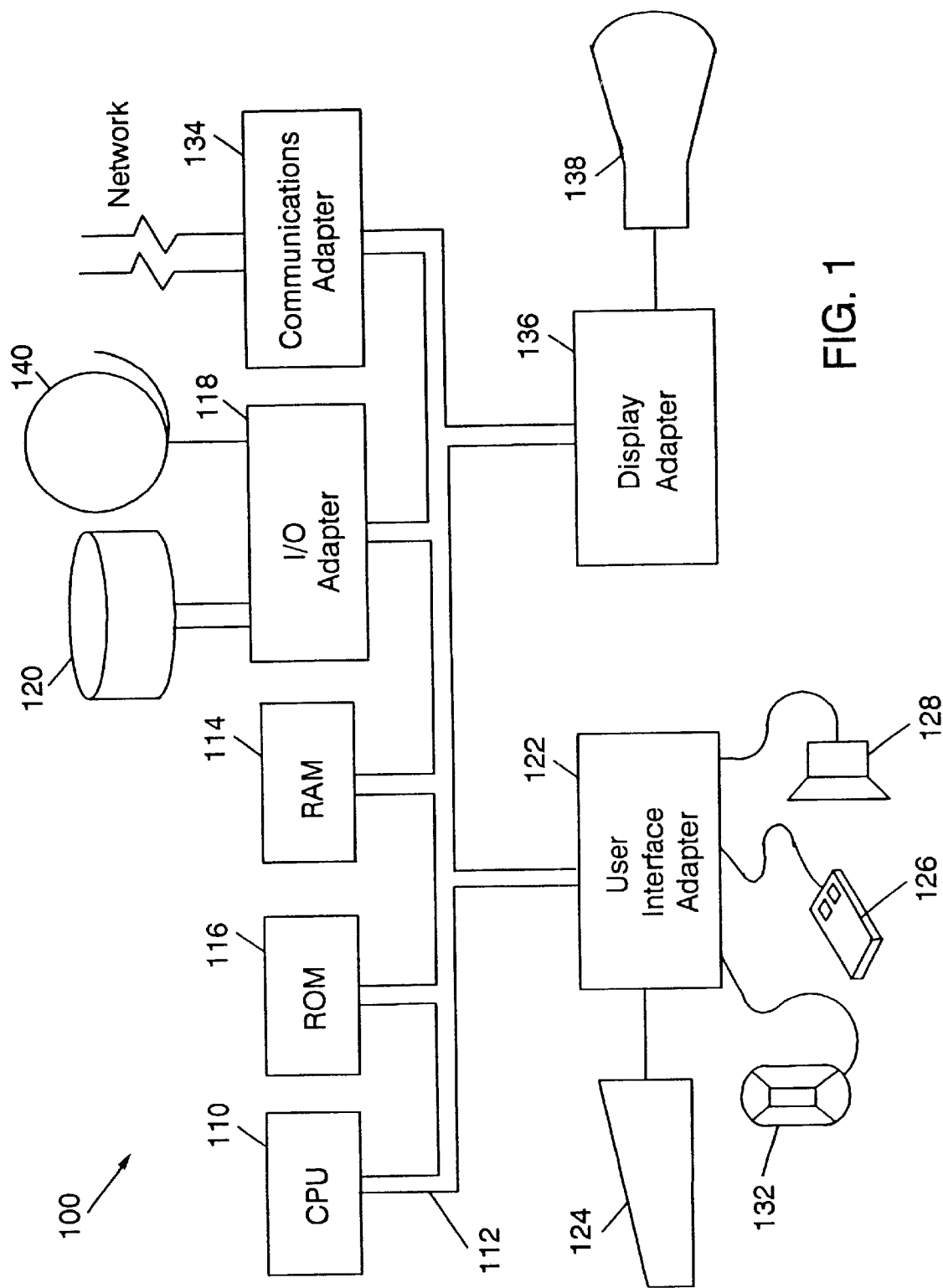
FIG. 1 illustrates, in block diagram form, a data processing system in accordance with one embodiment of the present invention.

The present invention provides a software hint initiated prefetch mechanism that supports prefetch of data and instructions from system memory to cache memory in response to a software instruction in an instruction stream. The mechanism issues a cache request in response to an explicit software instruction inserted into the instruction stream. When the "hint" instruction is executed, it points to registers that contain prefetch information related to the location and organization in system memory of the information to be prefetched. The mechanism schedules prefetching using these parameters until all of the information is prefetched, or a new "hint" instruction terminating prefetch is issued. Software initiated prefetch instructions may be executed out of order.

A software initiated prefetch may be advantageously used to bring blocks of data into cache memory before they are required by an execution unit. For example, a software initiated prefetch instruction may be inserted at the beginning of an instruction stream implementing a set of nested loops. In this way, data or instructions, or both, may be brought into cache before they are required by the execution units performing the loop operations. Moreover, by moving fetches outside the loop where they would otherwise be carried out repeatedly, the performance of a data processing system is improved.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of data processor 113 in accordance with the subject invention having central processing unit (CPU) 110, such as a conventional microprocessor, and a number of other units interconnected via system bus 112. Data processor 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting data processor 113 to a data processing network, and display adapter 136 for connecting bus 112 to display device 138. RAM 114 may include a multilevel cache memory as well as system memory. CPU 110 includes the software hint initiated prefetch mechanism according to the present invention. CPU 110 may include other circuitry not shown herein, which will include circuitry commonly found within a microprocessor, e.g., execution unit, bus interface unit, arithmetic logic unit, etc. CPU 110 may also reside on a single integrated circuit.

Figure 2:
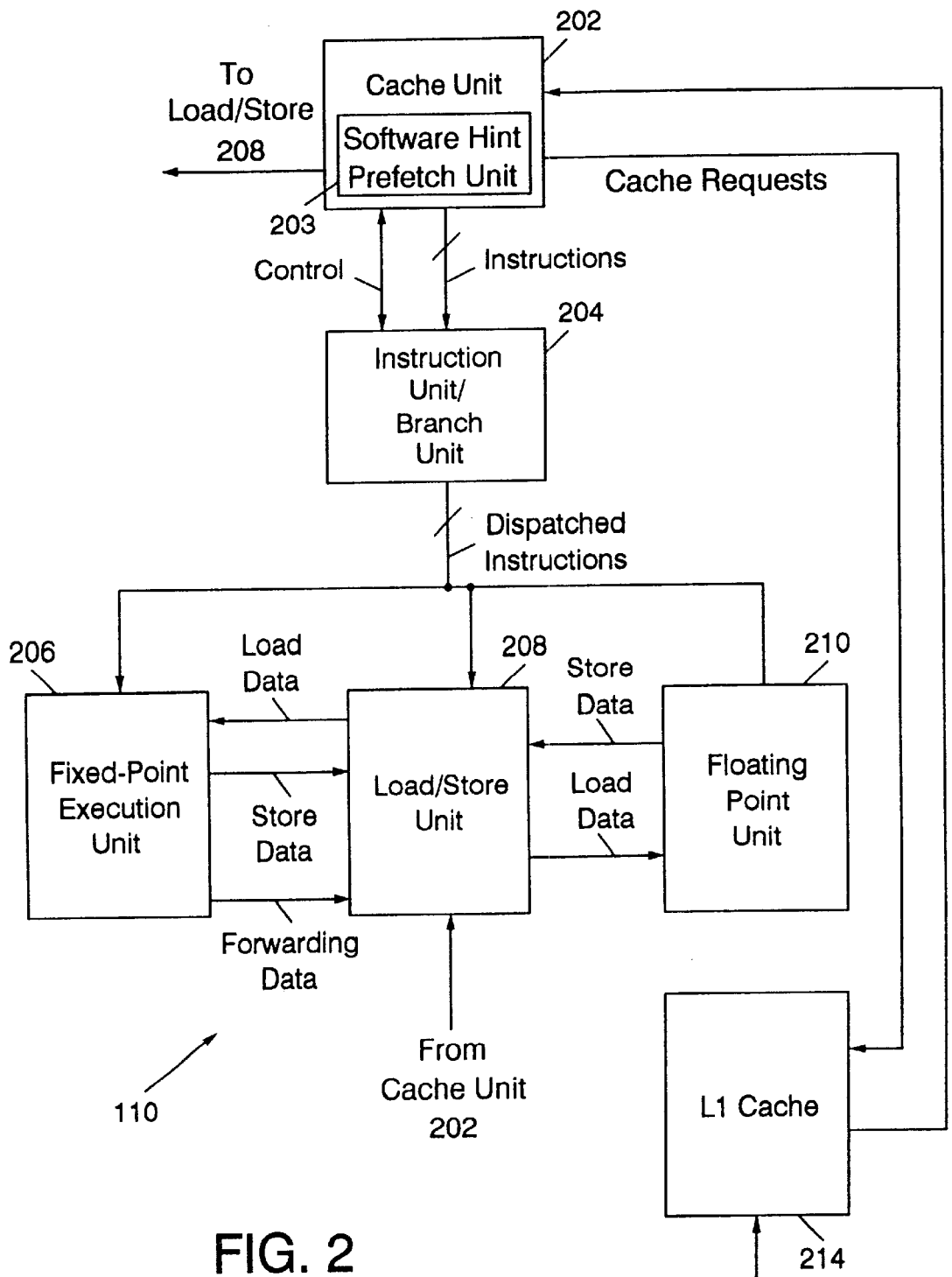
FIG. 2 illustrates, in block diagram form, a central processing unit in accordance with one embodiment of the present invention.

Refer now to FIG. 2 illustrating a portion of CPU 110 in further detail. CPU 110 includes cache unit 202 containing software hint prefetch unit 203. Cache unit 202 is coupled to instruction unit/branch unit 204 which dispatches instructions to the execution units, fixed-point execution unit 206, load/store unit 208 and floating point unit 210. Cache unit 202 is also coupled to load/store unit 208 for communicating cached data values thereto. Cache unit 202 is coupled to a level 1 (L1) cache 214 for communicating cache requests thereto and for receiving cached instructions and data therefrom. L1 cache 214 is further coupled to higher level cache memory, as shown in FIG. 3.

Figure 3B:
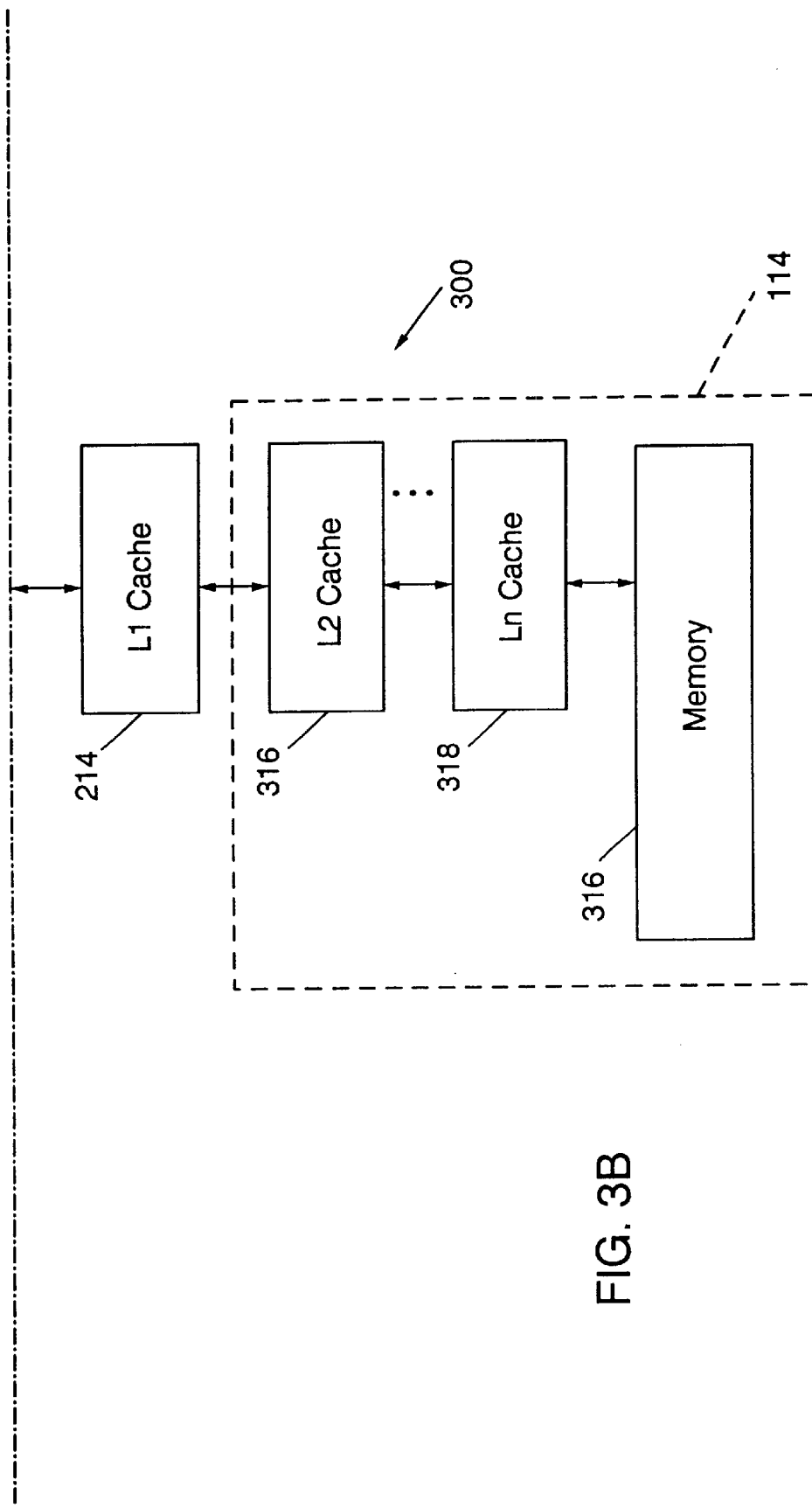

FIG. 3 illustrates portion 300 of data processing system 100. Portion 300 includes cache unit 202 including software hint prefetch unit 203 and non-prefetch cache request unit 304. Prefetch unit 302 processes software "hint" instructions and initiates prefetch cache requests. Non-prefetch cache request unit 304 responds to non-prefetch cache request from fetches and loads/stores and issues cache requests in response thereto. Cache unit 202 also includes lowest level (L0) cache 306. L0 cache 306 may be an instruction cache. Alternatively, in an embodiment of the present invention, L0 cache may be a data cache, and in yet another embodiment L0 cache 306 may be a combined instruction and data cache.

Prefetch unit 302 executes software "hint" instructions thereby performing software initiated prefetches. Prefetch unit 302 includes a plurality of prefetch engines 308. Each prefetch engine 308 handles a single prefetch address stream. For example, if two blocks of data are to be multiplied together, two prefetch engines 308 may march along corresponding address streams prefetching the operands in the corresponding blocks.

Each of prefetch engines 308 is coupled to an input of multiplexer (MUX) 310 which selects the cache prefetch request from the corresponding prefetch engine 308 for the current prefetch stream. MUX 310 selects the current stream prefetch cache request in response to stream select signal 311 received from arbitration logic contained within prefetch unit 302, in accordance with a predetermined arbitration protocol. Exemplary protocols which may be employed are discussed below in conjunction with MUX 312.

Cache requests are input to MUX 312, within software hint prefetch unit 203. MUX 312 receives prefetch cache requests from the output of MUX 310 on a first input, and cache requests output by non-prefetch cache request unit 304 on a second input. MUX 312 selects the cache request to be forwarded to L0 cache 306 in response to fetch priority signal 313. Fetch priority signal 313 is provided in accordance with a predetermined fetch priority protocol. Such a protocol may, for example, assign cache requests priority in chronological order wherein an oldest request is granted priority. Alternatively, an embodiment of a fetch priority protocol may assign the highest priority to a class of cache requests, such as instruction fetches. It would be understood that other alternative predetermined priority protocols are within the spirit and scope of the principles of the present invention.

Cache requests are output from MUX 312 to L0 cache 306. If the cache request misses in L0 cache 306, or does not have the required coherency, it may go to the next cache level higher in a cache memory hierarchy, such as L1 cache 214, L2 cache 316 and successively thereafter up to Ln cache 318. If the request misses in cache memory or does not have the required coherency, the request goes to system memory 316. A cache line may not have the required coherency to service all cache requests. For example, the cache may contain the line with a coherency allowing only read operations. However, the cache request may have been generated by an instruction intending to modify the data in the cache line. In such a case, the cache request may continue to higher cache levels, or to memory 316 in order to obtain the proper coherency. It would be understood that embodiments of the present invention include cache memory systems wherein L1 cache 214, and L2 cache 316 through Ln cache 318 may be instruction caches, data caches and combined instruction/data caches.

Refer now to FIG. 4A illustrating prefetch engine 308 in more detail. Prefetch engine 308 includes prefetch control register (PCR) 402 which contains a plurality of fields for containing prefetch control information. Fields in prefetch control register 402 will be described below in conjunction with FIG. 4B. The data in prefetch control register 402 is provided to prefetch control state machine 406 which generates prefetch cache requests in response thereto.

The initial prefetch address is provided by prefetch address register (PAR) 404 to prefetch address generator 408. Prefetch address generator 408 includes current prefetch address register (CPAR) that contains the address of the current line to be fetched. The address of the next line to be fetched is generated in adder 412. The current address is incremented or decremented, depending on a direction of the fetch, in response to a stride value. The stride specifies how to change the prefetch address to point to the next line to be prefetched, and is contained in a field in PCR 402, to be described. A direction control value contained in a field in PCR 402, discussed below, determines the direction of the fetch and correspondingly if the current address is to be incremented or decremented. Adder 412 decrements or increments the current address, as appropriate in response to a signal from state machine 406. Adder 412 outputs the next prefetch address and returns the address to CPAR 410. In an embodiment of the present invention, addresses may be virtual addresses. Alternatively, addresses may be real addresses in another embodiment of the present invention. At the end of a prefetch operation, CPAR 410 is cleared by state machine 406.

When the last line to be prefetched has been requested, the prefetch operation ends. This is detected by end of prefetch detect unit 414 in prefetch engine 308. End of prefetch detect unit 414 includes prefetch status register (PSR) 416. PSR 416 includes two fields which will be discussed in conjunction with FIG. 4C. One field includes a count of the number of lines that have been prefetched in the currently executing software hint initiated prefetch instruction. The current count is output to comparison logic 418 which compares the current count with a number of lines to be prefetched which is contained in a range field of PCR 402. The count is incremented by increment logic 422 after the current line prefetch request is issued, the count being incremented in response to a signal from prefetch control state machine 406. The incremented count is returned to PSR 416.

PCR 402 and PSR 416 are schematically illustrated in FIGS. 4B and 4C, respectively. In FIG. 4B, PSR 402 is shown to constitute, according to an embodiment of the present invention, eight fields, address field (PCR [ADDRESS]) 432, range field (PCR [RANGE]) 434, stride field (PCR [STRIDE]) 436, cache level field (PCR [LVL]) 438, coherency field (PCR [COHERENCY]) 440, overlap field (PCR [O]) 442, enable field (PCR [E]) 444, and direction field (PCR [DIR]) 446.

Fields 432, 434, 436 and 446 control addressing of cache lines. PCR [ADDRESS] 432, which may be K bits wide contains the address of the first line to be prefetched. PCR [RANGE] 434 contains the number of lines to be prefetched, and may be L bits in width. PCR [STRIDE] 436 specifies how to offset the current prefetch address to point to the next cache line to be prefetched. Thus, for example, if the stride is two, then every other line would be prefetched, up to the number of lines determined by the value in PCR [RANGE] 434. PCR [STRIDE] 436 may be M bits wide. PCR [DIR] 446 contains a data value indicating whether the prefetch address is incremented or decremented as prefetching is performed. PCR [DIR] 446 may be S bits wide. S, in one embodiment of the present invention, may be a single bit.

Fields 438 and 440 control prefetch cache operations. PCR [LVL] 438 indicates which level of cache the data is to be prefetched into. Thus, in portion 300 of processor 110, in FIG. 3, the prefetch lines could be prefetched into L0 cache 306, L1 cache 214, L2 cache 316, through Ln cache 318. PCR [LVL] 438 may be N bits wide, wherein, in an embodiment in accordance with portion 300, FIG. 3, N would include a predetermined number of bits sufficient to represent the number of cache levels corresponding to the "Lnth" cache. PCR [COHERENCY] 440 includes a data value indicating the type of memory coherency that is imposed on the prefetch lines being accessed. For example, the prefetch request may hit a line currently in one or more of L0 cache 306, L1 cache 214, L2 cache 316 through Ln cache 318. The cache line would be tagged with a tag indicating its coherency state such as an exclusive state wherein only a single copy of the line exists in one of L0 cache 306, L1 cache 214, L2 cache 316 through Ln cache 318. If two or more copies of the same cache line are contained in L0 cache 306, L1 cache 214, L2 cache 316 through Ln cache 318, and each copy is unmodified, that is, mirrors the data in system memory 316, then the coherency state may be a shared state. If, however, the cache line has been modified, and thereby no longer mirrors the corresponding data in system memory 316, the coherency state may be a modified state. The data value contained in PCR [COHERENCY] 440 confines the prefetch to cache lines having the corresponding coherency state. If a cache hit is made on a cache line but the coherency state does not correspond to the value contained in coherency field 440, the request goes to system memory 316 to resolve the coherency.

Software hint prefetch unit 302 may simultaneously process more than one prefetch request. PCR [O] 442 includes a data value indicating that more than one prefetch request can be in process simultaneously. PCR [O] 442 may be implemented in an embodiment of data processor 100 which may perform multiple memory fetches as the same time. If PCR [O] 442 is reset, prefetch accesses will be serialized. PCR [O] 442 may be a predetermined number, R bits wide. In an embodiment of the present invention, R may be one bit.

A software hint prefetch is initiated by a write into PCR 402 of a fetch enable signal. PCR [E] 444 includes a data value that when set indicates that the information in the other fields, 432, 434, 436, 438, 440, 442 and 446 are correct, and that the prefetch operation should begin. Setting the enable data value informs prefetch control state machine 406 to initiate the prefetch operation. PCR [E] 444 may be reset in response to a software instruction. If PCR [E] 444 is reset while a prefetch operation is in progress, the prefetch will be canceled at the next logical breakpoint of prefetch requests. This will be further described in conjunction with FIG. 5. When prefetch is complete PCR [E] 444 is reset by state machine 406.

PSR 416 is schematically illustrated in FIG. 4C. PSR 416 includes two fields, count field (PSR [COUNT]) 448, which may be L bits wide, and done field (PSR [D]) 450, which may be T bits wide. PSR [COUNT] 448 indicates the number of lines that have been currently prefetched. As previously discussed, it is incremented by increment logic 422 in response to a signal from state machine 406 as each line is prefetched. PSR [COUNT] 448 is reset by state machine 406 when PCR [E] 444 in PCR 402 is set. PSR [D] 450 is set when the prefetch operation has completed, in response to a signal from state machine 406, and is reset when enable field 444 in PCR 402 is set. PSR [D] 450 may also be set when PCR [E] 444 is reset via software. In an embodiment of the present invention, T may be one bit.

It would be understood that the fields within PCR 402 and PSR 416 may be permuted without departing from the spirit and scope of the present invention. An alternative embodiment of the present invention may include PAR 404 in PCR 402, as well.

Figure 5B:
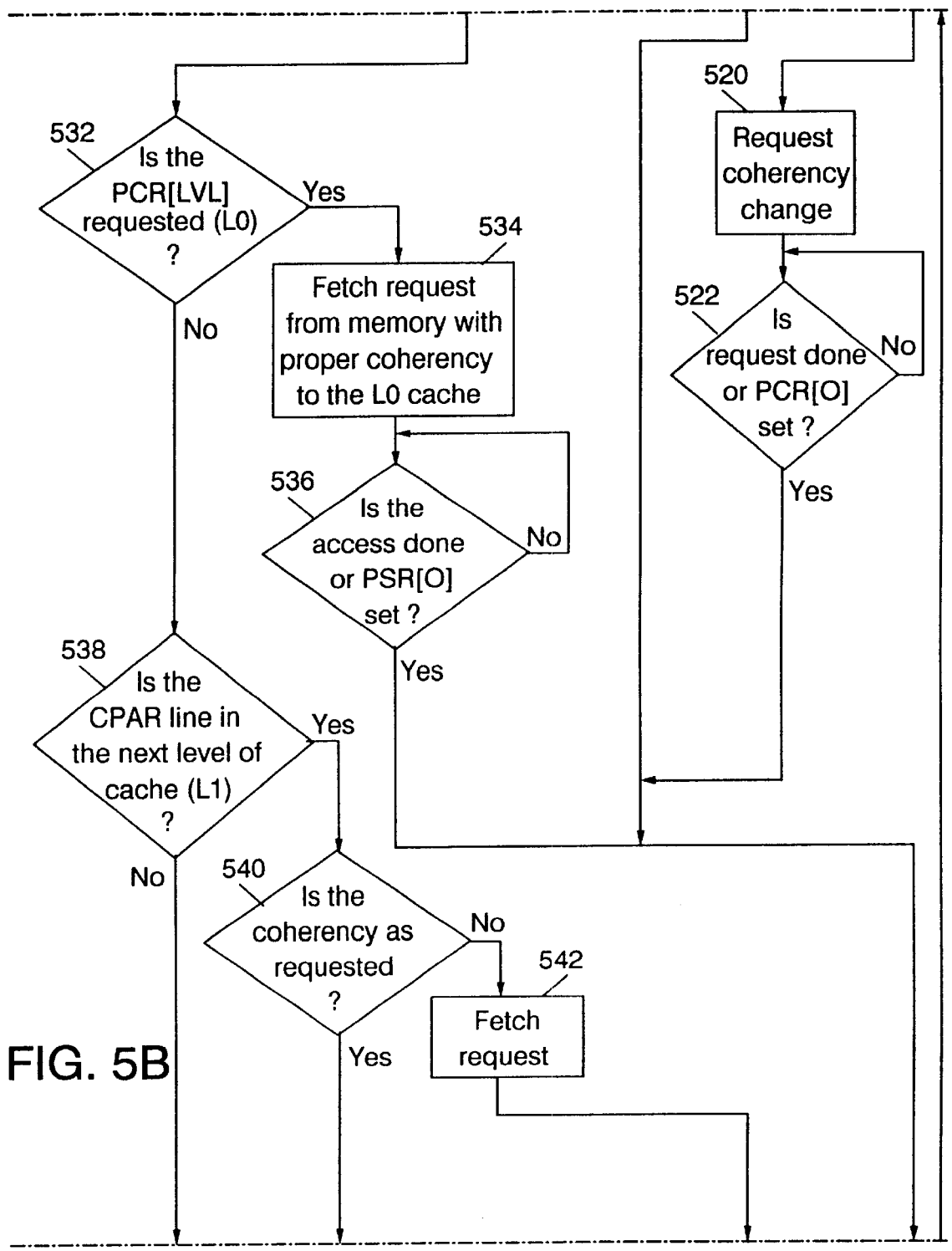
Figure 5C:
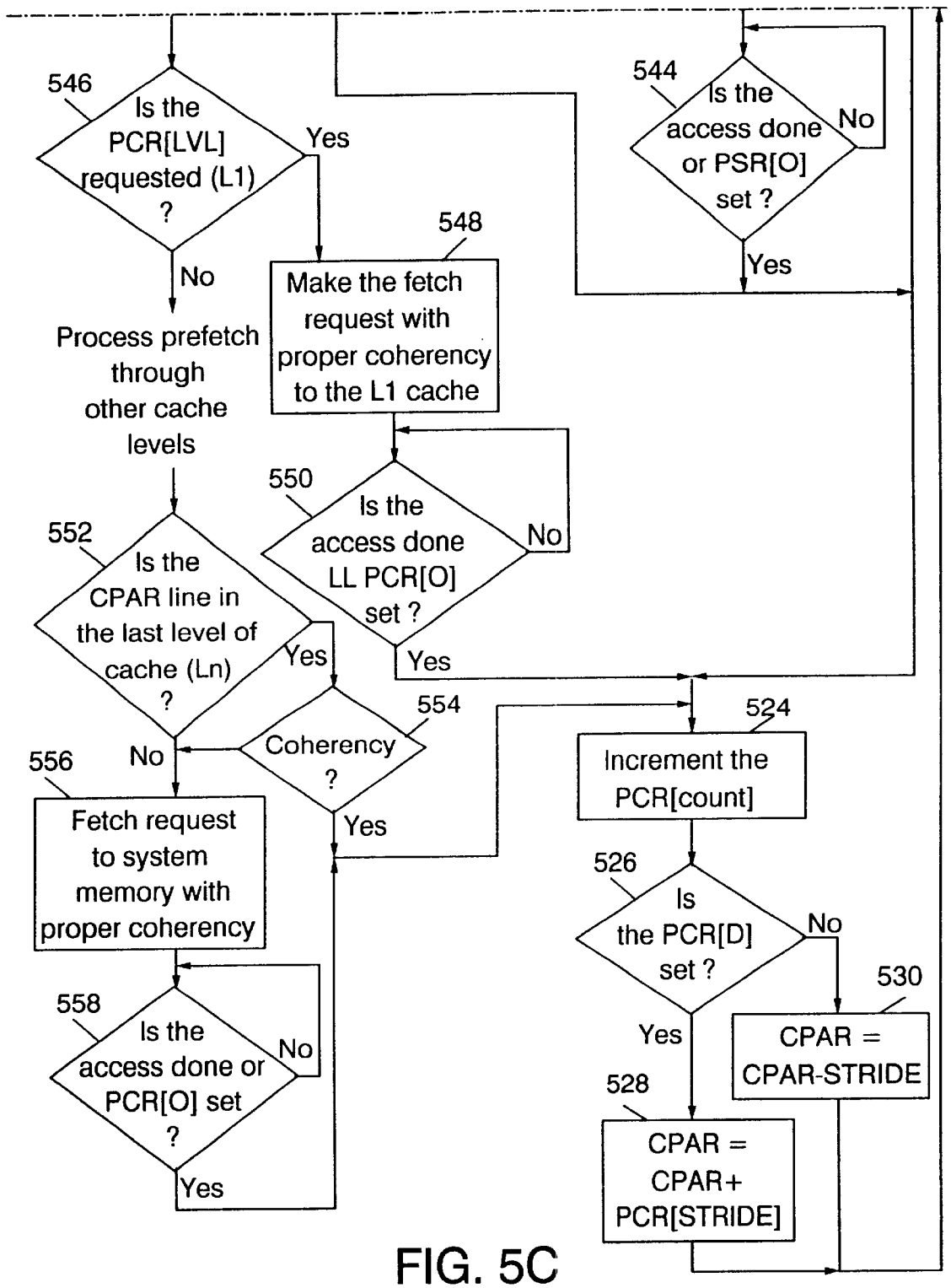

Prefetch engine 308 may be further understood by referring now to FIG. 5 in which is illustrated a flowchart of process 500 in accordance with an embodiment of prefetch control state machine 406. Process 500 initiates with a software write to PCR 402, in step 502. In step 504, a reset is issued to PSR 416 to reset PSR [D] 450 and PSR [COUNT] 448. CPAR 410 is set to PCR [ADDRESS] 432 in step 506.

If prefetch is enabled, then state machine 406 issues prefetch requests for the cache lines to be prefetched. In step 508, prefetch enable is determined by testing PCR [E] 444. If PCR [E] 444 has not been set, prefetch is not enabled and in step 510 process 500 terminates by setting PSR [D] 450, in step 510. As discussed hereinabove, PCR [E] 444 may be reset by software. If such a reset occurs, when a prefetch operation returns to step 508, it will terminate by following the "NO" branch to step 510. Otherwise, in step 508, prefetch is enabled and process 500 proceeds to prefetch cache lines.

In step 512, PCR [RANGE] 434 is compared with PSR [COUNT] 448. If the count and range are equal, then prefetch is complete and, in step 514, PCR [E] 444 is reset and PSR [D] 450 is set, terminating process 500. Otherwise, the next cache line is prefetched by first determining, in step 516, if the current cache line, as contained in CPAR 410, is in the L0 cache.

If, in step 516, the L0 cache contains the current cache line, the coherency of the cache line in the L0 cache is tested in step against the requested coherency, PCR [COHERENCY] 440, in step 518. If the cache line coherency is not the requested coherency, a coherency change request is issued via a request for the cache line from system memory 316, in step 520. In step 522, process 500 waits until the request is complete unless overlapped prefetches are allowed wherein PCR [O] 442 is set. If, in step 518, the cache line coherency is as requested, steps 520 and 522 are bypassed by the "YES" branch in step 518.

State machine 406 then prepares to request the next cache line to be prefetched. Process 500 continues with step 524 by incrementing PCR [COUNT]. In step 526, process 500 determines whether the current address should be incremented or decremented to fetch the next cache line by testing PCR [D] 446. If PCR [D] 446 is set, a current address in CPAR 410 is incremented by the stride, PCR [STRIDE] 436 and loaded back into CPAR 410, in step 428. If, however, PCR [D] 446 is reset, in step 526, then, in step 530, the address of the next cache line to be prefetched is set by decrementing the current address in CPAR 410 by the stride in PCR [STRIDE] 436 and reloaded into CPAR 410. Process 500 then returns to step 508 to request the next cache line to be prefetched.

If, however, in step 516, cache line to be prefetched was not in the L0 cache, and, in step 532, the L0 cache is the requested level in PCR [LVL] 438 a fetch is requested from memory 316 with the proper coherency to L0 cache 306, in step 534. In step 536, process 500 waits until access is complete unless overlapped requests are allowed, signaled by PCR [O] 442 being set, step 536. Process 500 then continues by preparing to fetch the next cache line by proceeding to step 524, as previously described.

If, in step 532, the L0 cache was not the requested cache level, prefetch control state machine 406 then looks for the current cache line in higher level caches. In step 538, prefetch control state machine 406 in accordance with process 500 determines if the current cache line to be prefetched is in L1 cache 214. If the current line is in L1 cache 214, the coherency of the line is tested in step 540 against the requested coherency in PCR [COHERENCY] 440, in step 540. If the coherency is as requested, the prefetch into cache is not required and process 500 continues with step 524, as described hereinabove. Otherwise, a fetch request is issued to system memory 316 in step 542 and in step 544 prefetch control state machine 406 waits until the access is complete unless overlapped prefetch requests are admitted wherein PCR [O] is set. Process 500 then continues with the prefetch of the next cache line in step 524, as described above.

If, however, in step 538, the current cache line to be prefetched was not in L1 cache 214, the requested level is tested in step 546. If, in step 546, the requested level, PCR [LVL] 438, is L1 cache 214, then the fetch request is made in step 548, and in step 550, the state machine 406 waits until the access is complete or otherwise proceeds if overlapped prefetch requests may be processed as signals by PCR [O] being set. State machine 406 in accordance with process 500 then continues with a prefetch of the next cache line by proceeding to step 524, described hereinabove.

If, in step 546, the requested level was not L1 cache 214, the prefetch request is processed through succeeding levels of cache in the same fashion as in steps 546, 548, and 550, until, in step 552, the last level of cache, Ln cache 318 is reached. If, in step 552, the current cache lin is in Ln cache 318, the coherency is tested in step 554. If the cache line has a proper coherency, the prefetch request is not required and process 500 continues with step 524. Otherwise, in step 554, a fetch request is issued to system memory 316 in step 556. Likewise, if in step 552 the current cache line is not an Ln cache 316, the fetch request to system memory 316, in step 556, is issued. In step 558, prefetch control state machine 406 waits until the access is complete, or proceeds if overlapped prefetch requests are admitted, as indicated by PCR [O] being set. Process 500 then continues with a prefetch of the next cache line by continuing at step 524, described above.

Although the present invention and its advantages have been described in detail, it should be understood that various changes, substitutions and alterations can be made herein without departing from the spirit and scope of the invention as defined by the appended claims.

What is claimed is:

1. An apparatus for software hint initiated prefetch comprising:
    circuitry operable for issuing at least one prefetch request to one or more memory devices in response to a software instruction, said circuitry including at least one first register having a plurality of fields each operable for receiving a corresponding data value, each data value specifying a parameter for controlling said prefetch, wherein said circuitry comprises at least one prefetch engine, each prefetch engine being operable for issuing one of said at least one prefetch request, each said prefetch engine including one of said at least one first register, and wherein each prefetch engine further comprises a prefetch control state machine, wherein in each prefetch engine further comprises circuitry operable for detecting an end of prefetch, and wherein in said circuitry operable for detecting an end of prefetch comprises:
        a second register operable for containing a count representing a number of cache lines currently prefetched, said second register being operable for resetting by said prefetched control state machine;
        comparison logic coupled to said second register operable for receiving therefrom said number of cache lines currently prefetched, said comparison logic being operable for receiving a number of cache lines to be prefetched from said first register, wherein said comparison logic outputs a prefetch done signal if said number of cache lines currently prefetched equals said number of cache lines to be prefetched; and incrementing circuitry operable for incrementing said number of cache lines currently prefetched, said incrementing circuitry being operable for inputting an incremented number of cache lines into said second register.

2. An apparatus for software hint initiated prefetch comprising:

circuitry operable for issuing at least one prefetch request to one or more memory devices in response to a software instruction, said circuitry including at least one first register having a plurality of fields each operable for receiving a corresponding data value, each data value specifying a parameter for controlling said prefetch, wherein said circuitry comprises at least one prefetch engine, each prefetch engine being operable for issuing one of said at least one prefetch request, each said prefetch engine including one of said at least one first register, and wherein in each prefetch engine further comprises:

a prefetch address generator; and a second register operable for receiving a prefetch address for specifying an address of a first cache line to be prefetched, wherein said prefetch address generator comprises:

a third register operable for receiving said prefetch address from said second register; and an accumulator coupled to said third register operable for receiving said address therefrom, said accumulator being operable for receiving a data value representing an address increment from said first register, and outputting an incremented address pointing to a next cache line for prefetching, wherein said third register is operable for updating with said incremented address.

3. A method of software hint initiated prefetch comprising the steps of:

storing a plurality of prefetch specifications in a register in response to a software instruction;

initiating a prefetch request for a cache line having an address corresponding to a first one of said plurality of prefetch specifications, wherein said steps of initiating a prefetch request further comprises the step of sequentially initiating subsequent prefetch request for at least one next cache line.

4. The method of claim 3 wherein said step of initiating a prefetch request further comprises the steps of:

incrementing a counter in response to each prefetch request issued; and terminating said subsequent prefetch requests when a value of said counter is not less than a preselected value of third one of said plurality of prefetch specifications.

5. The method of claim 3 wherein said step of sequentially initiating subsequent prefetch requests further comprises the step of generating an address of said at least one next cache line, said generating step comprising the steps of:

adding a preselected data value of a third one of said plurality of prefetch specifications to a current prefetch address; and if a fourth one of said plurality of prefetch specifications has a preselected value, negating said preselected data value of said third one of said plurality of specifications prior to said adding step.

6. An apparatus for software hint initiated prefetch comprising:

circuitry operable for issuing at least one prefetch request to one or more memory devices in response to a software instruction, said circuitry including at least one first register having a plurality of fields each operable for receiving a corresponding data value, each data value specifying a parameter for controlling said prefetch, and wherein a first one of said data value comprises a data value for indicating a type of memory coherency imposed on prefetch lines being accessed.

7. A method of software hint initiated prefetch comprising the steps of:

storing a plurality of prefetch specifications in a register in response to a software instruction; and initiating a prefetch request for a cache line having an address corresponding to a first one of said plurality of prefetch specifications, wherein a first one of said plurality of prefetch specifications comprises a prefetch specification indicating a type of memory coherency imposed on a prefetch line being accessed.

8. A data processing system for software hint initiated prefetch comprising:

at least one first memory device and at least one second memory device;

a data processor coupled to said at least one first and second memory devices, said data processor comprising:

circuitry operable for issuing at least one prefetch request to said at least one first and second memory devices in response to a software instruction, said circuitry including at least one first register having a plurality of fields each operable for receiving a corresponding data value, each data value specifying a parameter for controlling said prefetch, wherein a first one of said plurality of fields is operable for receiving a data value for indicating a type of memory coherency imposed on a prefetch line being accessed.

* * * * *